United States Patent [19]

Reade

[11] 4,126,477

[45] Nov. 21, 1978

[54] BETA-SPODUMENE GLASS-CERAMICS EXHIBITING EXCELLENT DIMENSIONAL STABILITY

[75] Inventor: Richard F. Reade, Corning, N.Y.

[73] Assignee: Corning Glass Works, Corning, N.Y.

[21] Appl. No.: 794,347

[22] Filed: May 6, 1977

[51] Int. Cl.$^2$ .......................... C03B 32/00; C03C 3/22
[52] U.S. Cl. ........................................ 106/39.7; 65/33; 106/39.8
[58] Field of Search .................... 65/33; 106/39.7, 39.8

[56] References Cited

U.S. PATENT DOCUMENTS

| | | | |
|---|---|---|---|
| 3,241,985 | 3/1966 | Kuwayama et al. | 65/33 X |
| 3,582,371 | 6/1971 | Bruno et al. | 65/33 X |
| 3,804,608 | 4/1974 | Gaskel et al. | 65/33 |
| 4,042,403 | 8/1977 | Reade | 65/33 |

*Primary Examiner*—S. Leon Bashore
*Assistant Examiner*—Frank W. Miga
*Attorney, Agent, or Firm*—Clinton S. Janes, Jr.; Clarence R. Patty, Jr.

[57] ABSTRACT

This invention is directed to the production of glass-ceramic articles having compositions within the $Li_2O$-$Al_2O_3$-$SiO_2$ field nucleated with a combination of $TiO_2$ + $ZrO_2$ wherein beta-spodumene solid solution constitutes the primary crystal phase. Mullite and/or corundum along with $ZrTiO_4$ solid solution and, occasionally, $ZrO_2$ solid solution are present as secondary crystal phases. Because of their low coefficients of thermal expansion and exceptional long time dimensional stability at temperatures up to 1000° C., the compositions can be useful in applications where extreme changes in temperature are experienced; for example, the construction of honeycomb structures used in regenerative heat exhchangers for turbine engines.

4 Claims, No Drawings ical in situ step is conducted at lower temperatures, e.g., 1000°–1100° C.

BETA-SPODUMENE GLASS-CERAMICS EXHIBITING EXCELLENT DIMENSIONAL STABILITY

BACKGROUND OF THE INVENTION

The manufacture of glass-ceramic articles involves three fundamental steps: first, a glass-forming batch, normally containing a nucleating agent, is melted; second, the melt is cooled at a sufficiently rapid rate that a glass body is formed which is essentially free of crystals; and, third, the glass body is exposed to a characteristic heat treatment procedure to cause crystallization in situ to take place.

Customarily, the third or crystallization step is performed in two parts. Thus, the glass body is initially heated to a temperature slightly above the transformation range thereof to cause the development of nuclei in the glass body which provide sites for the subsequent growth of crystals. Thereafter, the nucleated glass body is heated to a higher temperature, commonly above the softening point of the glass, to effect the growth of crystals on the nuclei.

The crystallization in situ mechanism leads to the substantially simultaneous growth of crystals on countless nuclei. Accordingly, a glass-ceramic article conventionally consists of uniformly fine-grained crystals randomly oriented, but homogeneously dispersed, throughout a residual glassy matrix. Normally, a glass-ceramic article is highly crystalline, i.e., at least 50% and frequently in excess of 75% by volume crystalline. This high crystallinity dictates that the physical properties exhibited by a glass-ceramic article are more nearly similar to those of the crystals than to those of the glassy phase. Furthermore, the composition of, and consequently the physical properties of, the residual glassy matrix are far removed from those of the parent or precursor glass since the constituents comprising the crystal phase will have been extracted therefrom. Finally, the crystallization in situ mechanism provides articles which are free from voids and non-porous.

U.S. Pat. No. 2,920,971 initiated glass-ceramic technology and reference is hereby made to that patent for a more detailed discussion of the microstructure, physical properties, and the method for making such articles.

U.S. Pat. No. 3,582,385 describes glass-ceramic bodies exhibiting good dimensional stability up to temperatures of about 800° C. The bodies had compositions consisting essentially, by weight on the oxide basis, of 3.5–5% $Li_2O$, 2.5–5% BaO, 15–21% $Al_2O_3$, 65–75% $SiO_2$, and 3.5–8% of a nucleating agent composed of 3–8% $TiO_2$ and 0–3% $ZrO_2$, the sum of $Li_2O$, BaO, $Al_2O_3$, $SiO_2$, $TiO_2$, and $ZrO_2$ constituting at least 98% of the full composition. Beta-spodumene solid solution comprised the primary crystal phase with a minor amount of celsian. Oxides such as MgO, ZnO, and $B_2O_3$ were preferably absent from the compositions because their presence led to the formation of secondary crystal phases having varying solid solubility with beta-spodumene. For example, the inclusion of MgO might lead to the growth of such secondary crystal phases as spinel, cordierite, and/or cristobalite either during the crystallization heat treatment or, more significant from a product standpoint, during subsequent prolonged exposures of the body to high temperatures. Cristobalite is a high expansion form of silica which often develops along with cordierite in thermally unstable, magnesia-containing, beta-spodumene solid solution glass-ceramic articles. The density changes that can accompany the growth of such phases will be reflected in overall dimensional instability of the article at elevated temperatures. The combined development of cordierite and cristobalite is particularly undesirable and will result in elongations of several thousand parts per million after relative brief exposures to a temperature of 950° C. Strains of that level far exceed the strain tolerance of the bodies when utilized as fine-bore honeycombs in regenerative heat exchanger applications.

Ser. No. 578,379, filed May 19, 1975 by the present applicant, now U.S. Pat. No. 4,042,403, is also directed to glass-ceramic bodies demonstrating excellent high temperature dimensional stability. The operable compositions consist essentially, by weight on the oxide basis, of about 3–5% $Li_2O$, 0.25–2.5% MgO, 15–20% $Al_2O_3$, 68–75% $SiO_2$, and 2.5–5% $TiO_2$ with, optionally, up to 3% $ZrO_2$. A vital facet of the composition involves maintaining a molar ratio $Li_2O$:MgO of at least 2:1. Beta-spodumene solid solution comprises the principal and, sometimes, sole crystal phase with anatase and/or rutile frequently composing a secondary crystal phase. The $Li_2O$:MgO ratio is critical in assuring the absence of the development of cordierite and/or cristobalite as an extraneous crystal phase.

SUMMARY OF THE INVENTION

I have found that glass-ceramic bodies exhibiting average coefficients of thermal expansion (0°–1000° C.) of less than about $20 \times 10^{-7}$/° C. and total elongations after 1000 hours at 950° C. of less than about 750 parts per million (PPM) can be produced wherein beta-spodumene solid solution (s.s.) constitutes the primary crystal phase but which also contain substantial amounts of mullite ($3Al_2O_3.2SiO_2$) and/or corundum ($Al_2O_3$) along with $ZrTiO_4$ s.s. and, occasionally, $ZrO_2$ s.s. as secondary crystal phases. The precursor glasses consist essentially, in weight percent on the oxide basis, of 3.7–7.5% $Li_2O$, 18.5–33% $Al_2O_3$, 55–75% $SiO_2$, and 3.4–5.0% $RO_2$, wherein $RO_2$ consists of 1.5–2.5% $TiO_2$ and 1–2.7% $ZrO_2$ in a molar ratio $TiO_2$:$ZrO_2$ between about 3:1–1:1.

Nucleation through a combination of $TiO_2$ + $ZrO_2$ is vital to secure the desired minor phase assemblage and fine-grained microstructure. $TiO_2$ alone is less efficient as a nucleating agent on a molar equivalent basis than the combination of $TiO_2$ + $ZrO_2$. Furthermore, and most importantly, nucleation with $TiO_2$ alone fosters the development of $Al_2TiO_5$, particularly when $As_2O_3$ is present. After extended exposure at elevated temperatures, $Al_2TiO_5$ decomposes to rutile ($TiO_2$) and corundum. Such decomposition, which is also augmented by the presence of arsenic (conventionally employed as a fining agent for glass compositions of the present type), can lead to extreme dimensional instability upon prolonged operation of the glass-ceramic at high temperatures. Nucleation with $ZrO_2$ alone is impractical because of the very limited solubility thereof in the instant glass compositions. Moreover, $ZrO_2$ alone is a comparatively inefficient nucleating agent up to at least the 3% by weight level. Such amounts would require melting temperatures far in excess of those conventionally utilized with precursor glasses for glass-ceramics.

The inclusion of arsenic not only accelerates the formation of $Al_2TiO_5$ when crystallization in situ of the glass is carried out at high temperatures, e.g., 1200°–1300° C., but also accelerates its subsequent decomposition into rutile and corundum when the crystalline article is used in applications involving operating temperatures of about 800°–950° C. This paradox may be rationalized if it is assumed that As$^{+3}$ ions concentrate in the glassy phase which exists along the grain boundaries or within grain boundary nodes of the initial polycrystalline array of beta-spodumene s.s. crystallites. It is conjectured that As$^{+3}$ ions soften the glassy phase to allow more rapid diffusion of Al$^{+3}$ or Ti$^{+4}$ ions, whichever are the more mobile. Faster diffusion would permit a more rapid approach to equilibrium of the reaction $$Al_2O_3 + TiO_2 \rightleftarrows Al_2TiO_5$$

at any given temperature.

Where $TiO_2$ is utilized alone as the nucleating agent, it is possible to develop mullite as a minor phase rather than $Al_2TiO_5$, but only within very narrow compositional limits. Mullite will be formed as a minor phase in compositions of the type $Li_2O.mAl_2O_3.nSiO_2:XTiO_2:YAs_2O_3$ wherein $m \geqq 1.2$, $n \geqq 7$, $X \leqq 3.8$ mole percent, and $Y \leqq 0.2$ mole percent, but preferably zero. $TiO_2$ at the 3.8 mole percent level is near the lower limit consistent with the formation of a fine-grained beta-spodumene glass-ceramic, but cracking of the article during the crystallization treatment is commonplace. Where $TiO_2$ is present at about the 4.1 mole percent level, mullite and $Al_2TiO_5$ are formed with about equal probability. Either or both may be present, even in the absence of $As_2O_3$, but breakage still remains a problem, however. Fracture of the article is essentially eliminated with $TiO_2$ contents of at least about 4.4 mole percent, but at such concentrations $Al_2TiO_5$ develops to the substantial exclusion of mullite.

The use of a combination of $TiO_2 + ZrO_2$ for nucleation results in a series of solid solutions depending upon the $TiO_2:ZrO_2$ mole ratio:

| Mole Ratio | Solid Solution |
| --- | --- |
| 9:1 | Rutile only |
| 5.7:1 | Rutile + $ZrTiO_4$ |
| 4:1 | $ZrTiO_4$ + Rutile |
| 3:1 | $ZrTiO_4$ + Rutile (trace) |
| 1.5:1 | $ZrTiO_4$ only |
| 1:1 | $ZrTiO_4$ + $ZrO_2$ |

These experimentally-determined phase assemblages accord with the predictions set out in the $TiO_2:ZrO_2$ binary system (Phase Diagrams for Ceramists, Levin, Robbins, and McMurdie, The American Ceramic Society, Inc., 1964, FIGS. 369–370). In this respect, the combination $TiO_2 + ZrO_2$ in $Li_2O-Al_2O_3-SiO_2$ glasses appears to function as a subsystem whose ultimate crystallization products are independent of the other constituents of the composition.

The combination of $TiO_2 + ZrO_2$ permits the use of low total nucleant contents and promotes the growth of mullite instead of $Al_2TiO_5$. Those objectives are achieved by restricting the molar ratio $TiO_2:ZrO_2$ to values between about 3:1 and 1:1. In that range efficient nucleation is effected and $ZrTiO_4$ solid solution is produced which, by competing effectively with $Al_2O_3$ for available $TiO_2$, inhibits the development of $Al_2TiO_5$. The excess $Al_2O_3$ is then free to combine with $SiO_2$ to form mullite. In compositions containing low $SiO_2$ levels, $Al_2O_3$ is stable with respect to mullite, thereby in agreement with the prediction of the $Li_2O-Al_2O_3-SiO_2$ ternary phase diagram regarding the stability region for mullite (Phase Diagrams for Ceramists, Levin, Robbins, and McMurdie, The American Ceramic Society, Inc., 1964, FIG. 449). To insure the virtual absence of $Al_2TiO_5$ or of any uncombined $TiO_2$ or $ZrO_2$ species, a molar ratio $TiO_2:ZrO_2$ of about 3:2 is preferred.

Minor amounts (up to 1.5%) of MgO can be substituted on a molar basis for $Li_2O$, as described in Ser. No. 578,379, supra. That is, a molar ratio $Li_2O:MgO$ of at least 2:1 must be maintained. The inclusion of MgO aids in avoiding cracking during the crystallization step and, at the low levels employed and when substituted for $Li_2O$ in the proper molar ratio, does not cause the development of cordierite ($2MgO.2Al_2O_3.5SiO_2$) during the crystallization step or after extended exposure of the glass-ceramic to high temperatures.

The inclusion of ZnO also assists in inhibiting cracks during the crystallization but it must be avoided since its presence results in the formation of gahnite ($ZnO.Al_2O_3$), a reversible phase having a solubility which varies as a function of time and temperature, thereby fostering dimensional instability.

In general, the preferred compositions will consist essentially solely of $Li_2O$, $Al_2O_3$, $SiO_2$, $TiO_2$, and $ZrO_2$ in the proper proportions to assure excellent long term thermal stability. However, the addition of a minor amount of MgO can be practically useful as a melting aid and a mineralizer. A molar ratio $Al_2O_3/(Li_2O + MgO)$ will be maintained between about 1.2–1.5 to insure the development of the desired mullite and/or corundum phases.

The process of the invention comprehends melting a properly-defined batch for the precursor glass. The melt is simultaneously cooled to a temperature at least within the transformation range (optionally to room temperature) and a glass article of a desired configuration shaped therefrom. The glass article is heated to a temperature between about 1150°–1350° C. to effect the crystallization in situ. Customarily, the crystallization step will be divided into two parts. Thus, the glass article will initially be heated to temperatures between about 750°–950° C. to induce nucleation, after which the temperature will be raised to 1150°–1350° C. This preferred practice results in a glass-ceramic having a more uniformly fine-grained microstructure. [The transformation range has been defined as that temperature at which a molten mass is transformed into an amorphous solid and is conventionally deemed to lie in the vicinity of the annealing point of a glass.]

The glasses of the invention nucleate very rapidly. Therefore, particularly where thin-walled glass tubing is the product configuration, nucleation periods of no more than about 15 minutes can be adequate. However, much longer nucleation times can be employed, e.g., up to 12 hours, with no harm to the final microstructure. As a matter of fact, some crystallization may proceed with such long dwell periods within the nucleation range. Nevertheless, such long nucleation periods are not viewed with favor from a commercial point of view inasmuch as the microstructure of the glass-ceramic is not significantly different from that obtained with a shorter nucleation period. Thus, a nucleation period of about six hours has been deemed to be a practical maximum.

Also, the growth of crystals can be very rapid, especially when undertaken at the upper extreme of the operable crystallization range. For example, a highly crystalline article can be secured after only one hour heat treatment. However, to insure the optimum dimensional stability in the final product, longer exposures will customarily be utilized to accomplish substantially total crystallization. Nonetheless, whereas much longer crystallization periods can be successfully employed, commercial practice has equated an exposure of about 24 hours to be a practical maximum.

In the laboratory examples tabulated below, the molten glass-forming batches were shaped into articles and cooled to ambient or room temperature to permit the inspection of glass quality. That practice is not required and, where speed of production and fuel economics are uppermost, the melts will only be cooled to a temperature at least within, and preferably slightly below, the transformation range to form a glass body. Thereafter, the glass body will be reheated to promote nucleation and crystallization. Finally, whereas the laboratory heat treating schedules reported below contemplated explicit dwell periods at specific temperatures, such practice must be recognized as illustrative only and as a matter of convenience, rather than a limitative. Thus, no hold periods as such are necessary to the operability of the invention. The sole requirement is that the glass article be subjected to temperatures within the 1150°–1350° C. interval.

The dimensional stability of those glass-ceramics assist in obtaining a homogeneous melt, and then deposited into clean platinum crucibles. After covering, the crucibles were moved to a furnace operating at 1550° C. and held thereat for 4 hours. The temperature was then raised to 1650° C. to increase the fluidity of the melt and maintained at that temperature for 16 hours to alter the $As^{+3}$:$As^{+5}$ ion ratio for improved fining of the glass. Thereafter, the melts were poured into steel molds to yield slabs about 12 inches × 4 inches × ½ inch, and the slabs immediately transferred to an annealer operating at about 500° C.

That low annealing temperature was employed to cool the slabs sufficiently rapidly through the region of crystallization to avoid premature devitrification, especially on the glass face in contact with the pouring surface or the surface of the annealer. However, the cooling through the annealing range is carried out at a rate slow enough to avoid spontaneous breakage in the annealer or when the slab is cut or sawed.

Glass bars about 4 inches × 1 inch × 0.5 inch were cut from the annealed slabs for exposure to the crystallization heat treatment and subsequent physical property measurements.

$As_2O_3$ was included to perform its conventional function as a fining agent.

TABLE I

|  | 1 | 2 | 3 | 4 | 5 | 6 | 7 | 8 | 9 |
|---|---|---|---|---|---|---|---|---|---|
| $SiO_2$ | 56.8 | 56.6 | 58.0 | 60.2 | 63.3 | 66.1 | 65.9 | 65.8 | 64.3 |
| $Al_2O_3$ | 32.1 | 32.0 | 31.1 | 29.2 | 26.9 | 24.9 | 24.9 | 24.8 | 26.7 |
| $Li_2O$ | 7.1 | 6.1 | 6.8 | 5.6 | 5.9 | 5.5 | 5.5 | 5.5 | 5.3 |
| MgO | — | 1.3 | — | 1.2 | — | — | — | — | — |
| $TiO_2$ | 1.9 | 1.9 | 1.9 | 1.8 | 1.8 | 1.8 | 1.8 | 1.5 | 1.7 |
| $ZrO_2$ | 1.9 | 1.9 | 2.0 | 1.9 | 1.9 | 1.8 | 1.8 | 2.3 | 1.8 |
| $As_2O_3$ | 0.2 | 0.2 | 0.3 | 0.2 | 0.2 | — | 0.2 | 0.3 | 0.3 |
| $TiO_2$:$ZrO_2$ | 3:2 | 3:2 | 3:2 | 3:2 | 3:2 | 3:2 | 3:2 | 1:1 | 3:2 |
| $Li_2O$:MgO | — | 6.5:1 | — | 6.5:1 | — | — | — | — | — |
|  | 10 | 11 | 12 | 13 | 14 | 15 | 16 | 17 | 18 |
| $SiO_2$ | 65.7 | 65.5 | 65.6 | 68.7 | 68.5 | 71.2 | 61.9 | 61.7 | 60.2 |
| $Al_2O_3$ | 24.8 | 24.7 | 24.7 | 22.2 | 22.1 | 20.1 | 28.0 | 27.9 | 30.0 |
| $Li_2O$ | 4.7 | 4.7 | 4.4 | 4.2 | 4.2 | 3.8 | 6.2 | 6.1 | 6.0 |
| MgO | 1.0 | 1.0 | 1.5 | 0.9 | 0.9 | 0.8 | — | — | — |
| $TiO_2$ | 1.8 | 1.9 | 1.8 | 1.8 | 2.0 | 1.9 | 2.0 | 1.6 | 1.9 |
| $ZrO_2$ | 1.8 | 2.0 | 1.8 | 1.9 | 2.1 | 2.0 | 2.0 | 2.5 | 2.0 |
| $As_2O_3$ | 0.2 | 0.2 | 0.3 | 0.3 | 0.2 | 0.2 | — | — | — |
| $TiO_2$:$ZrO_2$ | 3:2 | 3:2 | 3:2 | 3:2 | 3:2 | 3:2 | 3:2 | 1:1 | 3:2 |
| $Li_2O$:MgO | 6.5:1 | 6.5:1 | 4:1 | 6.5:1 | 6.5:1 | 6.5:1 | — | — | — |
|  | 19 | 20 | 21 | 22 | 23 | 24 | 25 | 26 |  |
| $SiO_2$ | 68.4 | 68.6 | 69.2 | 71.8 | 71.1 | 73.0 | 69.1 | 67.6 |  |
| $Al_2O_3$ | 22.1 | 22.2 | 20.9 | 20.3 | 20.1 | 18.6 | 22.6 | 21.9 |  |
| $Li_2O$ | 4.9 | 4.9 | 4.6 | 4.5 | 4.4 | 4.5 | 5.0 | 4.8 |  |
| $TiO_2$ | 2.1 | 1.7 | 2.5 | 1.7 | 2.1 | 1.9 | 1.6 | 2.8 |  |
| $ZrO_2$ | 2.1 | 2.7 | 2.5 | 1.7 | 2.2 | 2.0 | 1.6 | 2.9 |  |
| $As_2O_3$ | 0.4 | — | 0.4 | — | — | — | 0.1 | — |  |
| $TiO_2$:$ZrO_2$ | 3:2 | 1:1 | 3:2 | 3:2 | 3:2 | 3:2 | 3:2 | 3:2 |  |
| $Li_2O$:MgO | — | — | — | — | — | — | — | — |  | having relatively high $SiO_2$ contents appears to be somewhat improved when crystallization temperatures within the upper extreme of the range are used. However, such high temperatures can have a deleterious effect on compositions of lower $SiO_2$ content. Thus, a coarse-grained body of poor dimensional stability can result therefrom.

DESCRIPTION OF PREFERRED EMBODIMENTS

Table I records a group of thermally crystallizable glass compositions expressed in weight percent on the oxide basis. The actual batch components can comprise any materials, either the oxides or other compounds, which, when melted together with the other batch ingredients, are converted to the desired oxide compositions in the proper proportions. The molar ratios $TiO_2$:$ZrO_2$ and $Li_2O$:MgO are also tabulated. The batch ingredients were compounded, ballmilled together to Exemplary composition 26, containing over 5.0% by weight $TiO_2$ + $ZrO_2$, showed considerable devitrification and dicing upon cooling from the melt and, therefore, was considered unsuitable for the instant invention.

Table II reports nine different heat treatments conducted in electrically-fired furnaces which were applied to the glass bars cut from the slabs of Table I. As is recited therein, each schedule comprehended heating the bar from room temperature (R.T.) to the nucleation range at 200°–300° C./hour. It will be recognized that slower or more rapid rates are operable where very thick or very thin-walled articles, respectively, are being treated. Moreover, the 200°–300° C./hour rate of temperature rise has been found to be satisfactory with a large number of article geometries in precluding thermal breakage.

Crystallization of the glass body takes place more rapidly as the temperature thereof is increased. Hence, the glass body is commonly raised to a temperature above its softening point to promote crystallization. Nevertheless, a balance must be maintained between the rate of temperature increase at which the glass body approaches and exceeds the softening point thereof, and the rate at which crystals are developing therein. For example, in the first stages of crystallization, the proportion of crystals to glassy matrix is so low that the article will deform quite readily as the softening point of the glass is approached. The use of formers or other means of physical support can be utilized to reduce this effect. The use of a substantial nucleation period enhances the rate of subsequent crystal growth, thereby also acting to reduce thermal deformation of the glass. In summary, the rate at which the temperature is raised will, desirably, balance the rate at which crystal growth takes place within the glass with the necessary degree of fluidity in the residual glass required to inhibit stress buildup and cracking. A heating rate of up to about 200° C./hour from the nucleation temperatures into the crystallization range has produced sound, essentially deformation-free articles in the majority of cases.

The rate at which the crystallized article can be cooled to room temperature from the crystallization range without damage from thermal shock is dependent upon the coefficient of thermal expansion of the article and the thickness dimensions thereof. Since the crystallized articles of the present invention exhibit very low coefficients of thermal expansion, viz., less than 20 × $10^{-7}/°$ C. over the range of 0°–1000° C., thin-walled articles can simply be removed from the furnace into the ambient environment. As a matter of convenience, the crystallized bars were merely left in the furnace at the conclusion of the heat treatment schedule, the electric current to the furnace shut off, and the bars permitted to cool to room temperature at furnace rate, which was estimated to range about 3°–5° C./minute.

TABLE II

| Schedule No. | Heat Treatment |
|---|---|
| A | Heat at 300° C./hour to 750° C.<br>No hold at 750° C.<br>Heat at 25° C./hour to 850° C.<br>No hold at 850° C.<br>Heat at 200° C/hour to 1200° C.<br>Hold at 1200° C. for 12 hours |
| B | Heat at 300° C./hour to 750° C.<br>No hold at 750° C.<br>Heat at 25° C./hour to 950° C.<br>No hold at 950° C.<br>Heat at 200° C./hour to 1225° C.<br>Hold at 1225° C. for 24 hours |
| C | Heat at 300° C./hour to 750° C.<br>No hold at 750° C.<br>Heat at 17° C./hour to 850° C.<br>No hold at 850° C.<br>Heat at 200° C./hour to 1250° C.<br>Hold at 1250° C. for 12 hours |
| D | Heat at 300° C./hour to 750° C.<br>No hold at 750° C.<br>Heat at 25° C./hour to 850° C.<br>No hold at 850° C.<br>Heat at 200° C./hour to 1250° C.<br>Hold at 1250° C. for 12 hours |
| E | Heat at 300° C./hour to 750° C.<br>No hold at 750° C.<br>Heat at 25° C./hour to 850° C.<br>No hold at 850° C.<br>Heat at 200° C./hour to 1300° C.<br>Hold at 1300° C. for 12 hours |
| F | Heat at 200° C./hour to 800° C.<br>Hold at 800° C. for two hours<br>Heat at 67° C./hour to 1000° C.<br>No hold at 1000° C.<br>Heat at 200° C./hour to 1250° C.<br>Hold at 1250° C. for 16 hours |
| G | Heat at 200° C./hour to 750° C.<br>Hold at 750° C. for four hours<br>Heat at 200° C./hour to 1300° C.<br>Hold at 1300° C. for 16 hours |
| H | Heat at 200° C./hour to 850° C.<br>Hold at 850° C. for four hours<br>Heat at 200° C./hour to 1300° C.<br>Hold at 1300° C. for 16 hours |
| I | Heat at 200° C./hour to 850° C.<br>Hold at 850° C. for two hours<br>Heat at 200° C./hour to 1000° C.<br>Hold at 1000° C. for two hours<br>Heat at 200° C./hour to 1300° C.<br>Hold at 1300° C. for 16 hours |

Table III reports the heat treatment schedules applied to the bar specimens of each member of Table I along with the crystal phases present, as identified through X-ray diffraction analysis, a qualitative appraisal of the grain size of the microstructure, the coefficient of thermal expansion over the range 0°–1000° C. ($\times 10^{-7}/°$ C.), and the change in length ($\Delta L/L$ in PPM) after being heated for 500 and 1000 hours at 950° C., and, in the case of Examples 22–24, after 2000 hours at 950° C., as measured by means of a length comparator of the type described by Wilmer Souder and Peter Hidnet, "Measurement of Thermal Expansion of Fused Silica", Scientific Papers of the Bureau of Standards, Vol. 21, Pages 1–23, Sept. 21, 1965. A designation of "poor" in Table III indicates elongations greater than 750 PPM.

The articles appeared to be highly crystalline, i.e. greater than 75% by volume crystalline, with beta-spodumene solid solution (s.s.) constituting at least 75% of the total crystallinity. In table III, the secondary phases are recorded in the order of amount present. In the finegrained samples, substantially all of the crystals were smaller than five microns in diameter with the great majority being less than one micron in diameter. The crystallized articles exhibited a densely-opaque, white appearance.

Whereas the classic formula for beta-spodumene is $Li_2O.Al_2O_3.4SiO_2$, the composition of the crystal phase in the glass-ceramic articles of the present invention does not conform exactly to that formula. Instead, it is more in the nature of a solid solution corresponding generally to the formula $Li_2O.Al_2O_3.nSiO_2$, where "$n$" can vary between about 3.5–10, depending upon the silica content of the precursor glass. There is also evidence that magnesium ions can also be incorporated into the crystal structure. However, an X-ray diffraction analysis invariably yields a pattern characteristic of beta-spodumene. Accordingly, that is the sense in which the expression "beta-spodumene solid solution" is employed in Table III.

TABLE III

| Example No. | Heat Treatment Schedule | Grain Size | Crystal Phases | Exp. Coef. | ΔL/L 500 hrs. | ΔL/L 1000 hrs. |
|---|---|---|---|---|---|---|
| 1 | A | Fine | Beta-spodumene s.s<br>Corundum, ZrTiO₄ s.s | 15.6 | −142 | — |
| 1 | B | " | " | 16.7 | −100 | −170 |
| 1 | D | " | " | 18.0 | −75 | — |
| 1 | E | Coarse | " | 12.9 | Poor | — |
| 2 | C | Medium | " | 15.1 | −111 | −192 |

TABLE III-continued

| | | | | | L/L | L/L |
|---|---|---|---|---|---|---|
| 3 | C | Fine | " | 15.2 | −161 | −238 |
| 4 | C | " | Beta-spodumene s.s Mullite, ZrTiO$_4$ s.s | 17.1 | −83 | −206 |
| 5 | C | " | " | 16.2 | −147 | −314 |
| 6 | C | " | " | 11.5 | −255 | −386 |
| 7 | A | " | " | 10.5 | −357 | — |
| 7 | E | " | " | 12.1 | −52 | — |
| 8 | C | " | Beta-spodumene s.s ZrTiO$_4$ s.s, Mullite, ZrO$_2$ s.s. | 11.0 | −413 | −558 |
| 9 | C | Medium | Beta-spodumene s.s., Mullite, ZrTiO$_4$ s.s. | — | −68 | −165 |
| 10 | A | Fine | " | 11.2 | −369 | Poor |
| 10 | D | " | " | 11.9 | −217 | −355 |
| 10 | E | " | " | 12.4 | +115 | +38 |
| 11 | D | " | " | — | −345 | — |
| 12 | C | " | " | 12.5 | −10 | −103 |
| 13 | A | " | " | 9.3 | Poor | — |
| 13 | D | " | " | 13.0 | −400 | — |
| 13 | E | " | " | 9.8 | −244 | — |
| 14 | D | " | " | — | −392 | — |
| 15 | A | " | " | 9.6 | Poor | — |

| Example No. | Heat Treatment Schedule | Grain Size | Crystal Phases | Exp. Coef. | L/L 500 hrs. | L/L 1000 hrs. | ΔL/L 2000 hrs. |
|---|---|---|---|---|---|---|---|
| 15 | D | Fine | Beta-spodumene s.s., Mullite, ZrTiO$_2$ s.s | 8.9 | Poor | — | |
| 15 | E | " | " | 9.5 | +51 | — | |
| 16 | G | " | " | — | −179 | −307 | — |
| 17 | G | Very fine | Beta-spodumene s.s Mullite, ZrTiO$_4$ s.s., ZrO$_2$ s.s. | — | −185 | −292 | — |
| 18 | F | Fine | Beta-spodumene s.s. Mullite, ZrTiO$_4$ s.s. | 16.0 | −287 | −349 | — |
| 19 | F | " | " | '8.0 | −91 | +67 | — |
| 20 | F | " | Beta-spodumene s.s Mullite, ZrTiO$_4$ s.s., ZrO$_2$ s.s. | — | −311 | −440 | — |
| 21 | G | " | Beta-spodumene s.s. Mullite, ZrTiO$_4$ s.s. | — | −227 | −348 | — |
| 22 | F | " | " | — | −338 | −442 | — |
| 22 | I | " | " | — | +20 | −64 | −108 |
| 23 | F | Fine | Beta-spodumene s.s. Mullite, ZrTiO$_4$ s.s. | — | −367 | −467 | — |
| 23 | H | " | " | 5.5 | −92 | −190 | −301 |
| 24 | I | " | " | — | −27 | −106 | −202 |
| 25 | G | Coarse | Poor nucleation | — | — | — | — |
| 26 | — | | Devitrified and diced when cooled from the melt | | | | |

An inspection of Table III confirms the observation made above that higher temperature heat treatments tend to improve the thermal dimensional stability of higher silica compositions. This is evidenced in Examples 7, 10, 13, and 15. However, high temperature crystallization treatments may not be beneficial with compositions of low silica content, as is demonstrated by the 1300° C. treatment of Example 1 which yielded a course-grained body of poor stability. Nevertheless, the determination of the optimum crystallization schedule for any particular glass composition is well-within the technical competence of the worker or ordinary skill in the glass-ceramic art. Exemplary compositions 22-24, having Li$_2$O, Al$_2$O$_3$, and SiO$_2$ in a molar ratio of approximately 1:1.33:8 are particularly noteworthy for yielding products exhibiting low coefficients of thermal expansion and excellent high temperature dimensional stability.

In Examples 16-18, the sum of TiO$_2$ + ZrO$_2$ totals approximately 2.6 mole percent. At that level, a molar ratio TiO$_2$:ZrO$_2$ of 4:1 provides such inefficient nucleation that course-grained crystallization results. In view of that factor, a molar ratio TiO$_2$:ZrO$_2$ of about 3:1 has been deemed to constitute a practical maximum.

Example 25, containing less than about 3.5% total of TiO$_2$ +ZrO$_2$, exhibits the result of poor nucleation, leading to the development of a coarse-grained body.

1. A method for making an opaque a glass-ceramic article demonstrating an average coefficient of thermal expansion (0°-1000° C.) less than about 20 × 10$^{-7}$/° C. and a change in length of less than about 750 PPM after an exposure of 1000 hours to temperatures up to 950° C. consisting essentially of fine-grained crystals of beta-spodumene solid solution, mullite and/or corundum, ZrTiO$_4$ solid solution, and, occasionally, ZrO$_2$ solid solution uniformly dispersed within a glassy matrix, said crystals constituting at least 75% by volume of the article which consists of the steps:
   a. melting a batch for a glass consisting essentially, in weight percent on the oxide basis, of 3.7-7.5% Li$_2$O, 18.5-33% Al$_2$O$_3$, 55-75% SiO$_2$, and 3.4-5.0% Ro$_2$, wherein RO$_2$ consists of 1.5-2.5% TiO$_2$ and 1-2.7% ZrO$_2$ in a molar ratio TiO$_2$:ZrO$_2$ between about 3:1-1:1;
   b. simultaneously cooling the melt to at least within the transformation range and shaping a glass article of a desired configuration therefrom;
   c. heating said glass article to a temperature between about 1150°-1350° C. to cause the crystallization in situ of fine-grained crystals of beta-spodumene solid solution, mullite and/or corundum, ZrTiO$_4$ solid solution, and, occasionally, ZrO$_2$ solid solution; and then
   d. cooling the crystallized article to room temperature.

2. A method according to claim 1 wherein said glass article is heated to a temperature between about 750°-950° C. to cause nucleation prior to heating to about 1150°-1350° C.

3. A method according to claim 1 wherein said glass also contains up to 1.5% MgO and has a molar ratio Li$_2$O:MgO of at least 2:1 and a molar ratio Al$_2$O$_3$:(Li$_2$O + MgO) between about 1.2-1.5.

4. An opaque glass-ceramic article made in accordance with the method of claim 1.

* * * * *

UNITED STATES PATENT AND TRADEMARK OFFICE
CERTIFICATE OF CORRECTION

PATENT NO. : 4,126,477
DATED : November 21, 1978
INVENTOR(S) : Richard F. Reade

It is certified that error appears in the above-identified patent and that said Letters Patent are hereby corrected as shown below:

Column 8, line 42, "finegrained" should be -- fine-grained --.

Columns 9 and 10, Table III-continued, Example 19, table heading Exp. Coef., "'8.0" should be -- 8.0 --.

Column 9, Claim 1, line 64, delete "a", second occurrence.

Column 10, Claim 1, line 45, "Ro$_2$," should be -- RO$_2$, --.

Signed and Sealed this

Thirty-first Day of July 1979

[SEAL]

Attest:

LUTRELLE F. PARKER

Attesting Officer     Acting Commissioner of Patents and Trademarks